Figure 1:
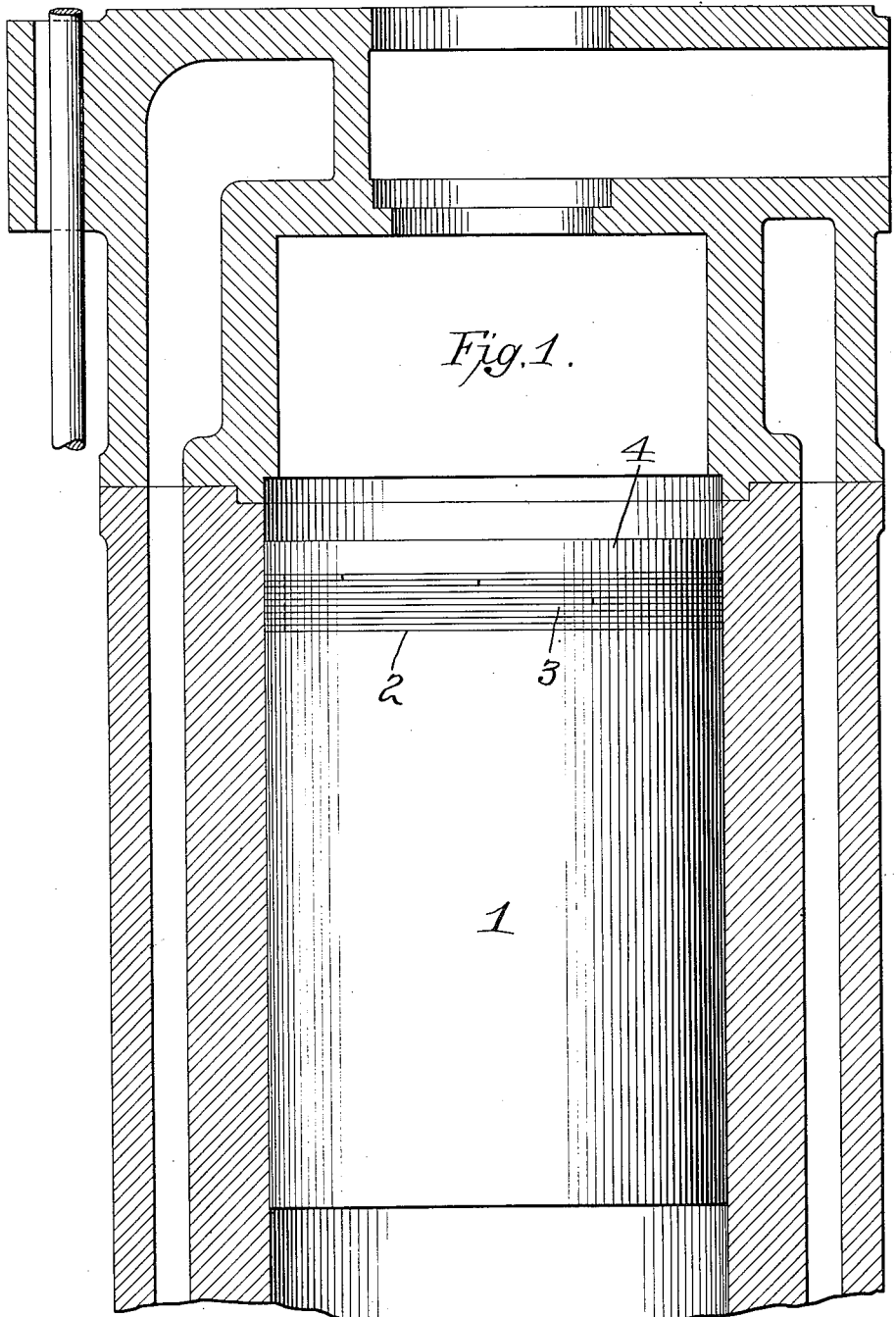

C. WHITE.
PISTON PACKING.
APPLICATION FILED JUNE 5, 1912.

1,064,269.

Patented June 10, 1913.

2 SHEETS—SHEET 1.

C. WHITE.
PISTON PACKING.
APPLICATION FILED JUNE 5, 1912.
1,064,269.
Patented June 10, 1913.
SHEETS—SHEET 2.
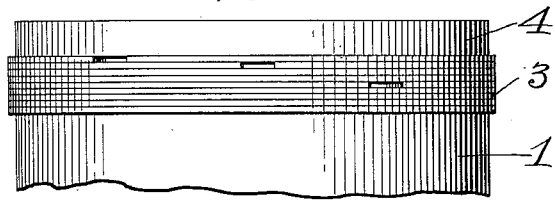
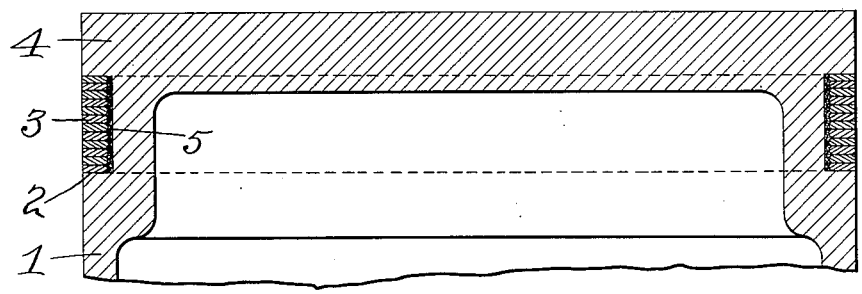
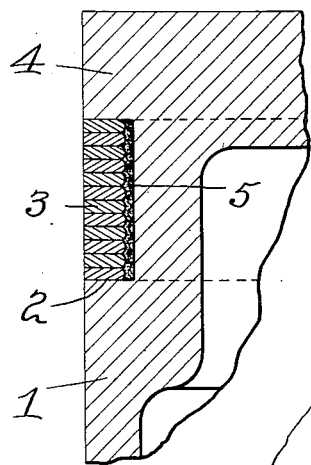
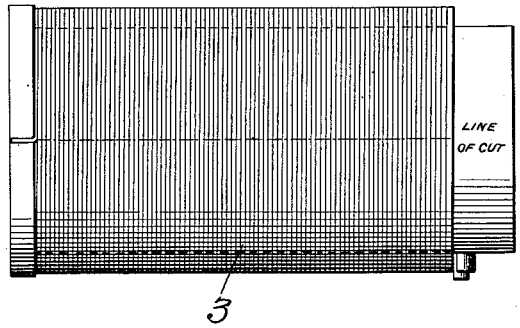
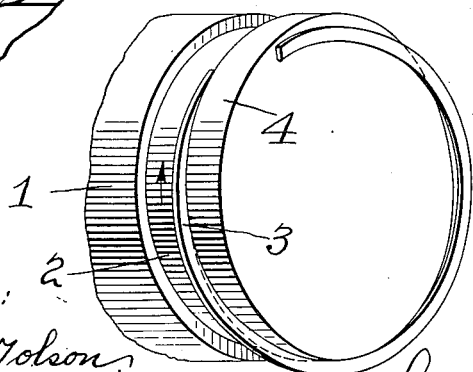
Attest:
Edw L. Tolson
Chas. F. Calhoun
Inventor:
Charles White,
by Spear, Middleton, Donaldson & Spear
Attys.

UNITED STATES PATENT OFFICE.

CHARLES WHITE, OF BALTIMORE, MARYLAND.

PISTON-PACKING.

1,064,269.　　　　Specification of Letters Patent.　　Patented June 10, 1913.

Application filed June 5, 1912. Serial No. 701,819.

*To all whom it may concern:*

Be it known that I, CHARLES WHITE, citizen of the United States, residing at Baltimore, Maryland, have invented certain new and useful Improvements in Piston-Packings, of which the following is a specification.

My invention relates to the packing of pistons for gas, steam or other engines, my object being to provide an inexpensive and efficient packing which will present in its manufacture and in its use advantages of an important character, all of which will appear from the following description.

The accompanying drawing shows in Figure 1 a view of part of a piston, designed for engines of various types, with my improvements embodied therein, a portion of the engine cylinder being also shown. Fig. 2 is a view of part of the piston showing the condition of the packing when the piston is detached from the engine cylinder. Fig. 3 is a sectional view of a part of the piston, and a portion of the cylinder wall. Fig. 4 is a view of one of the packing rings. Fig. 5 is a view illustrating the manner of making the rings. Fig. 6 is a view illustrating the manner of applying the rings to the piston.

In these drawings the piston 1 is provided with a recess or groove 2 near its inner end, into which groove are threaded a series of split rings 3. These rings are formed from a flat strip of metal or wire of a thickness of, say, about $\frac{1}{16}$ inch and a width of about $\frac{1}{4}$ inch.

In forming the rings the flat wire, which is of wrought metal with rounded edges, is wound on edge upon a mandrel the diameter of which corresponds substantially to the diameter of the bottom of the groove or recess in the piston, proper allowance being made for the use of a packing in the groove in which the inner edges of the split rings embed themselves, as will be hereinafter described. The flat wire is of such a width that the outside diameter of the convolutions thereof, when wound upon the mandrel and before grinding, will be approximately, though not exactly equal to the interior diameter of the cylinder in which the piston is to work. The wire, when wound, is suitably held at its ends. While so held it is ground to an outside diameter exactly equal to the inside diameter of the engine cylinder, which grinding takes off the outer rounded edge to flat form, leaving, however, the inner edges of their original rounded form. The wound wire is then cut by a thin tool which is made to traverse the convolutions of wire along a line parallel to the axis of the convolutions, or, in other words, parallel to the axis of the mandrel and of the piston to which the packing is to be applied. This cutter is of about $\frac{1}{16}$ inch in thickness, so that little of the ring is removed. This cutting of the convolutions will complete the formation of the rings, each being split by the cutting operation and adapted to be threaded over the end of the cylinder at 4, which is integral with the main body of the piston, and thus introduced into the groove or recess thereof. In thus applying the split rings they are not sprung apart circumferentially, and thus subjected to distortion, but their ends are spread apart laterally, as illustrated in Fig. 6, so that one end can be made to straddle the intact end portion 4 and enter the groove or recess, and then by turning the split ring in the arrow direction, Fig. 6, it will be introduced into the groove, and this method of introducing the rings can be followed out for the entire series. The rings do not need any means for securing them, such as pins, as they do not need to be held against circumferential creeping. About twelve rings will be used to fill the recess, and these rings will break joints.

As the rings are of the same internal diameter as the diameter of the piston at the bottom of the groove, and are of an exterior diameter equal to that of the interior of the cylinder, they will effectually pack both the bottom of the piston groove against the passage of pressure fluid and will also pack the joint between the piston and the cylinder. The rings have a natural resiliency or tendency to spread to a larger diameter owing to the character of the metal of which they are composed, and the fact that they are cut from a wound coil, and when the piston is not in the cylinder the rings will spread to the diameter shown in Fig. 2, but when introduced into the cylinder they will be contracted or compressed to the conditions shown in Fig. 1, bearing throughout upon the bottom of the groove in the piston or upon packing in the groove, and yet have a tendency to spread, which keeps them bearing upon the cylinder. Every zone of the packing may be said to be individually resilient and compensatory because each ring individually has a tendency to spring outwardly to compensate for any irregularities in the interior of the cylinder. Presenting as it does a number of crevices, the packing ring acts as a carrier for the lubricant to convey it to the back or inner end of the cylinder, where it is most needed because of the heat here due to the explosions and compression.

The rings formed as described are made from wire having smooth edges both on the outer and inner sides, and thus the rings are free from burs or rough edges such as would result from stamping, and when wound, ground and cut, as described, the rings need no further finishing or machine work of any character to true them up and render them serviceable, but after cutting them they may be at once placed in the groove of the piston for practical use.

With my invention, one composite packing ring will answer for three rings ordinarily used, which are disposed at different points along the cylinder, and therefore a maximum area of piston surface is left as a bearing surface to take the thrust or cross head strain that must exist in all trunk pistons.

No tool, special or otherwise, is needed to place the rings in position. Nor is it necessary to spread the ring or distort it circumferentially in order to get it in place, a lateral spreading of the ends being sufficient. The head portion of the piston, as stated above, is formed integral with the main body of the piston. This is of advantage, as the heat at the explosion end of the piston will readily radiate from this integral head portion throughout the main body of the piston and thence to the cylinder walls, a result which will not be present to a like extent in a construction where the head of the piston is formed as a separate piece attached to the main body, which construction too gives unequal expansion between the head of the piston and the main body of the piston because of the greater heating of the piston head, this being in a measure insulated by the joint from the said main body.

The packing mentioned above is shown at 5. This may be of any suitable material, though I consider an asbestos covered woven wire fabric as the best for the purpose. The inner rounded edges of the packing rings embed themselves in this asbestos fabric as illustrated, and thus each ring individually provides a joint packed against the passage of pressure along the bottom of the groove.

In the use of ordinary packing one piece rings, the lateral pressure of the ring against the walls of the groove will, in time, cause wear and some degree of looseness, which entails the pounding of the side edges of the ring against the groove walls resulting in more rapid wear. With my composite ring, however, the films of oil existing between the sections of the ring will take up this lateral thrust to a large extent and the ring may be said, therefore, to have lateral elasticity.

I claim:—

1. A piston packing consisting of flat spring wire bent into ring form, with the width of the wire at right angles to the axis of the ring, presenting the edges of the wire inwardly and outwardly respectively, the wire at its inner edge being of a diameter to fit the piston and at its outer edge of a diameter to fit the cylinder, said wire being split, substantially as described.

2. A piston packing consisting of a split ring of flat bent spring wire having its outer edge flat, and of a diameter to fit the cylinder, and its inner edge substantially rounded and of a diameter to fit the piston, substantially as described.

3. A piston packing consisting of a plurality of split rings of flat bent spring wire presenting their edges inwardly and outwardly, and of a diameter to fit respectively the piston and the cylinder, substantially as described.

4. A piston packing consisting of a plurality of split rings of flat bent spring wire, each having its outer edge flat and its inner edge substantially rounded and of a diameter to fit respectively the cylinder and piston, substantially as described.

5. A piston packing consisting of flat spring wire bent into ring form, with the width of the wire at right angles to the axis of the ring, presenting the edges of the wire inwardly and outwardly respectively, the wire at its inner edge being of a diameter to fit the piston and at its outer edge of a diameter to fit the cylinder, said wire being split and tending normally to spring outwardly, substantially as described.

In testimony whereof, I affix my signature in presence of two witnesses.

CHARLES WHITE.

Witnesses:
SAMUEL HOLTZ,
THOS. W. ELLIS.